United States Patent [19]

Reed, deceased et al.

[11] 4,270,575
[45] Jun. 2, 1981

[54] SPOOL VALVE ASSEMBLY

[75] Inventors: Frank A. Reed, deceased, late of South El Monte, Calif.; Paul M. Diemert, executor, 1639 Vallejo Way, Upland, Calif. 91786

[73] Assignee: Paul M. Diemert, San Antonio, Tex.

[21] Appl. No.: 23,131

[22] Filed: Mar. 23, 1979

Related U.S. Application Data

[62] Division of Ser. No. 885,621, Mar. 13, 1978, Pat. No. 4,176,987.

[51] Int. Cl.³ ............................................. F15B 13/04
[52] U.S. Cl. ................................. 137/625.69; 91/426
[58] Field of Search ...................... 91/426; 137/625.69

[56]  References Cited

U.S. PATENT DOCUMENTS

| | | | |
|---|---|---|---|
| 3,017,901 | 1/1962 | Hicks, Jr. | 251/DIG. 1 |
| 3,139,908 | 7/1964 | Strader | 137/625.69 X |
| 3,980,336 | 9/1976 | Bitonti | 91/426 X |
| 4,145,025 | 3/1979 | Bergeron | 137/625.66 X |

*Primary Examiner*—Gerald A. Michalsky
*Attorney, Agent, or Firm*—Sellers and Brace

[57]  ABSTRACT

A spool valve for use with pressurized fluid to control components of a control system. The spool valve has two stable positions in one of which the spool is firmly held by pressurized fluid.

5 Claims, 6 Drawing Figures

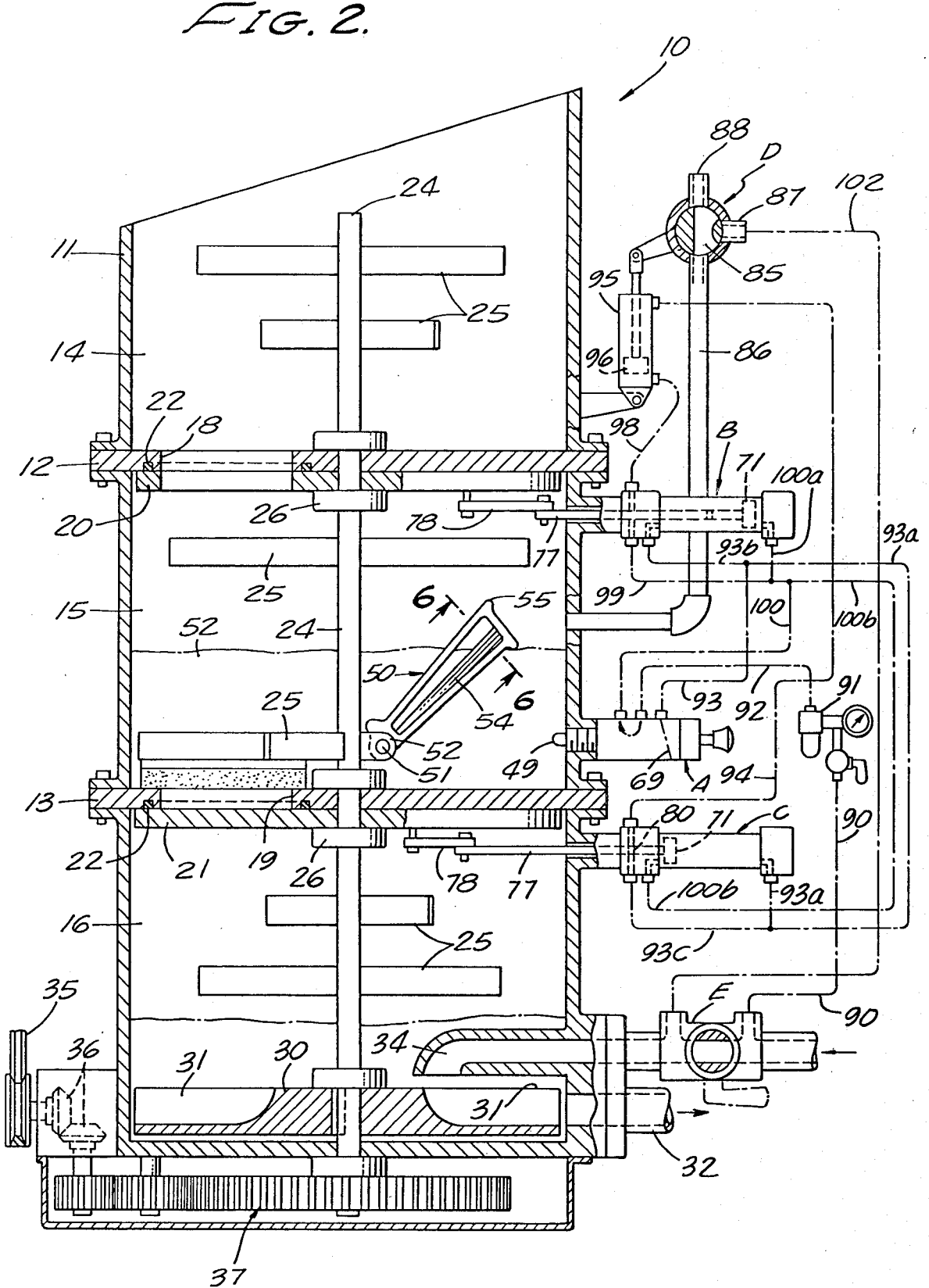

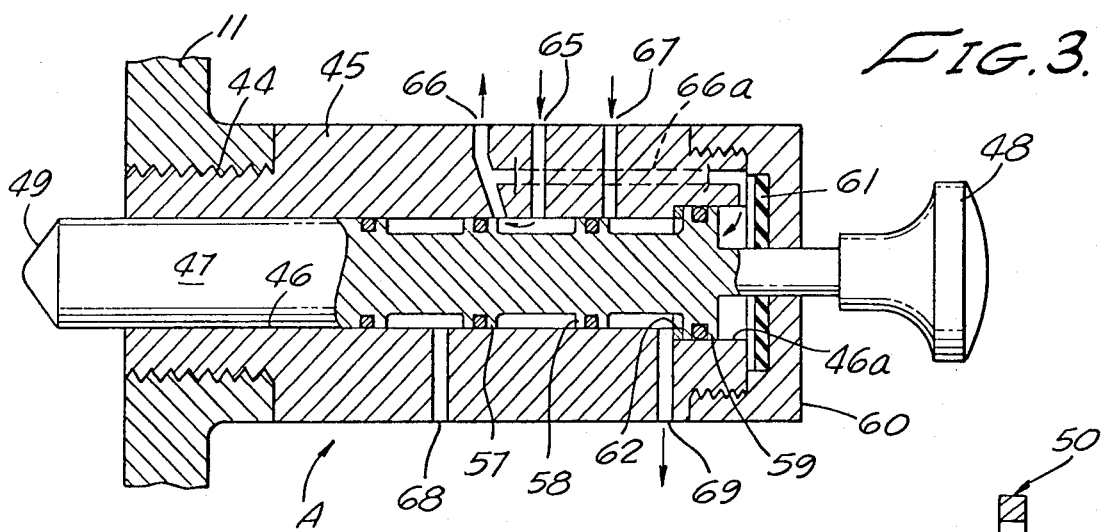
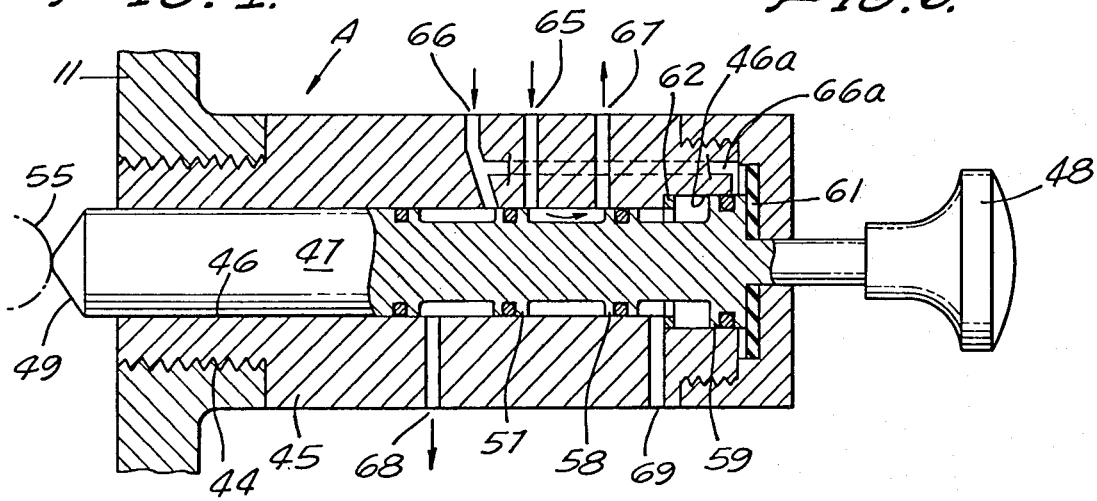
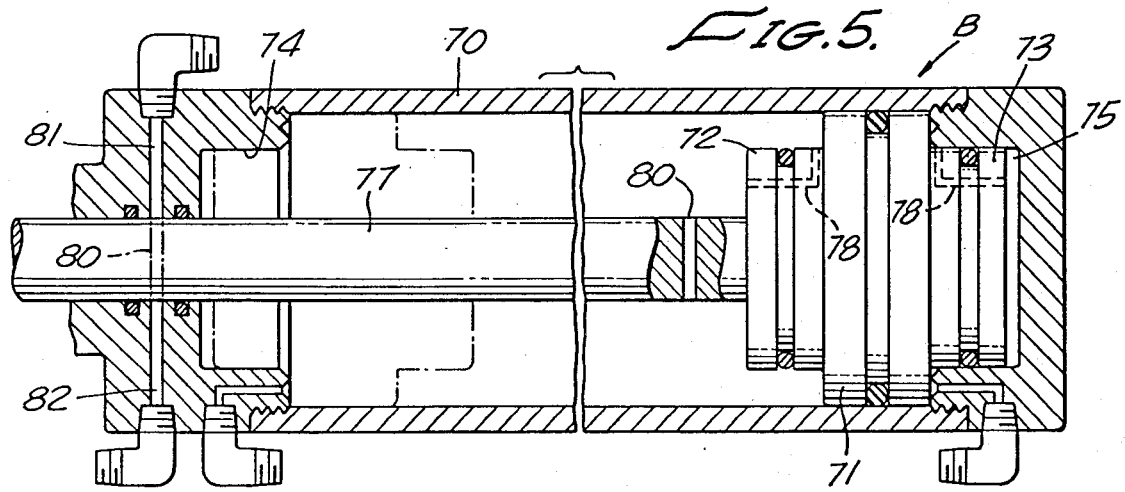

SPOOL VALVE ASSEMBLY

This application is a division of my co-pending application for a patent, Ser. No. 885,621, filed Mar. 13, 1978, now U.S. Pat. No. 4,176,987, entitled FLUID MATERIAL HANDLING APPARATUS.

This invention relates to fluid handling equipment, and more particularly to an improved spool valve assembly usable in mechanism control systems to control the flow of pressurized fluid.

BACKGROUND OF THE INVENTION

Numerous proposals have been made heretofore for equipment suitable for handling fluent particulate material from a bulk source and conveying this material in a continuous regulated stream to a point of use. Many of these machines make use of a pressurized gaseous stream as a material suspension and conveying medium. This transport mode requires suitable means for introducing the fluent material into the pressurized stream from a bin or other supply source subject to atmospheric pressure. A commonly utilized technique makes use of a continuously pressurized material dispensing chamber replenished from time to time from another normally pressurized chamber temporarily ventable to the atmosphere while being refilled from a supply source. Such equipment requires the use of flow control valves and operating means therefor operated in some predetermined sequence.

Ridley U.S. Pat. Nos. 2,949,275 and 3,090,593 each show material handling equipment utilizing manually controlled valves between the several fluent material handling chambers. Such equipment is relatively simple but requires skilled operators who pay strict attention to operating requirements and the need for manually controlling the several valves in proper sequence. Ryan U.S. Pat. No. 2,138,356 discloses a bag filling and weighing apparatus in which the various valves are controlled and operated electrically by a programming timer. The Kirchhoefer U.S. Pat. Nos. 3,190,509 and 3,315,824 also show automatically operated fluent material handling equipment using a timer to control solenoid operated valves in proper sequence. Such systems have the distinct disadvantage of requiring a source of electrical power not always available on construction projects. Moreover, electrical equipment exposed to the weather and to water typically encountered on construction projects pose hazards to the workmen and require special and expensive insulation safeguards. Domina U.S. Pat. Nos. 1,943,589 and 1,979,320 avoid the hazards and shortcomings posed by electric controls for fluid handling equipment and instead utilize pneumatically powered controls. However, his main control valve is driven through complex gear reduction mechanism from the motor operating the feeder for the material dispensing chamber. This expedient provided no assurance that the dispensing chamber will be refilled timely. Moreover, all of these prior machines are unnecessarily complex, bulky and costly to service and maintain.

SUMMARY OF THE INVENTION

The fluent material feeding apparatus of this invention is characterized by its unusual simplicity and the provision of efficient reliable control means for automatically replenishing the fluent material in the dispensing chamber when the supply in an intermediate feed chamber reaches a predetermined level. A single manually-reset spool valve restores the actuator for this valve to its armed or level-sensing position. Both the material dispensing apparatus and the controls therefor are powered pneumatically in timed sequence, the timing being controlled in part by the equalization of pressure across the material feed flow control valves, and in part by the position of the actuator for these valves.

Accordingly, it is a primary object of this invention to provide an improved spool valve.

Another object of the invention is the provision of an improved spool valve normally held in a first position by pressurized fluid and self-stabilized in a second position.

Another object of the invention is the provision of an improved two position spool valve.

Another object of the invention is the provision of a novel spool valve for use in controlling a pressurized fluid control system.

These and other more specific objects will appear upon reading the following specification and claims and upon considering in connection therewith the attached drawing to which they relate.

Referring now to the drawing in which a preferred embodiment of the invention is illustrated:

FIG. 2 is a view similar to FIG. 1 but showing the position of the control valve at the end of a material replenishing cycle with the main control valve reset and rearmed for the next replenishing cycle;

FIG. 3 is a cross-sectional view on an enlarged scale through the main control valve when armed in readiness to sense the need for a replenishing cycle;

FIG. 4 is a cross-sectional view through the FIG. 3 valve while a replenishing cycle is in progress;

FIG. 5 is a cross-sectional view of an enlarged scale through one of the actuators for the material flow control valves; and FIG. 6 is a cross-sectional view on an enlarged scale through the material level sensing means taken along line 6—6 on FIG. 2.

Figure 1:
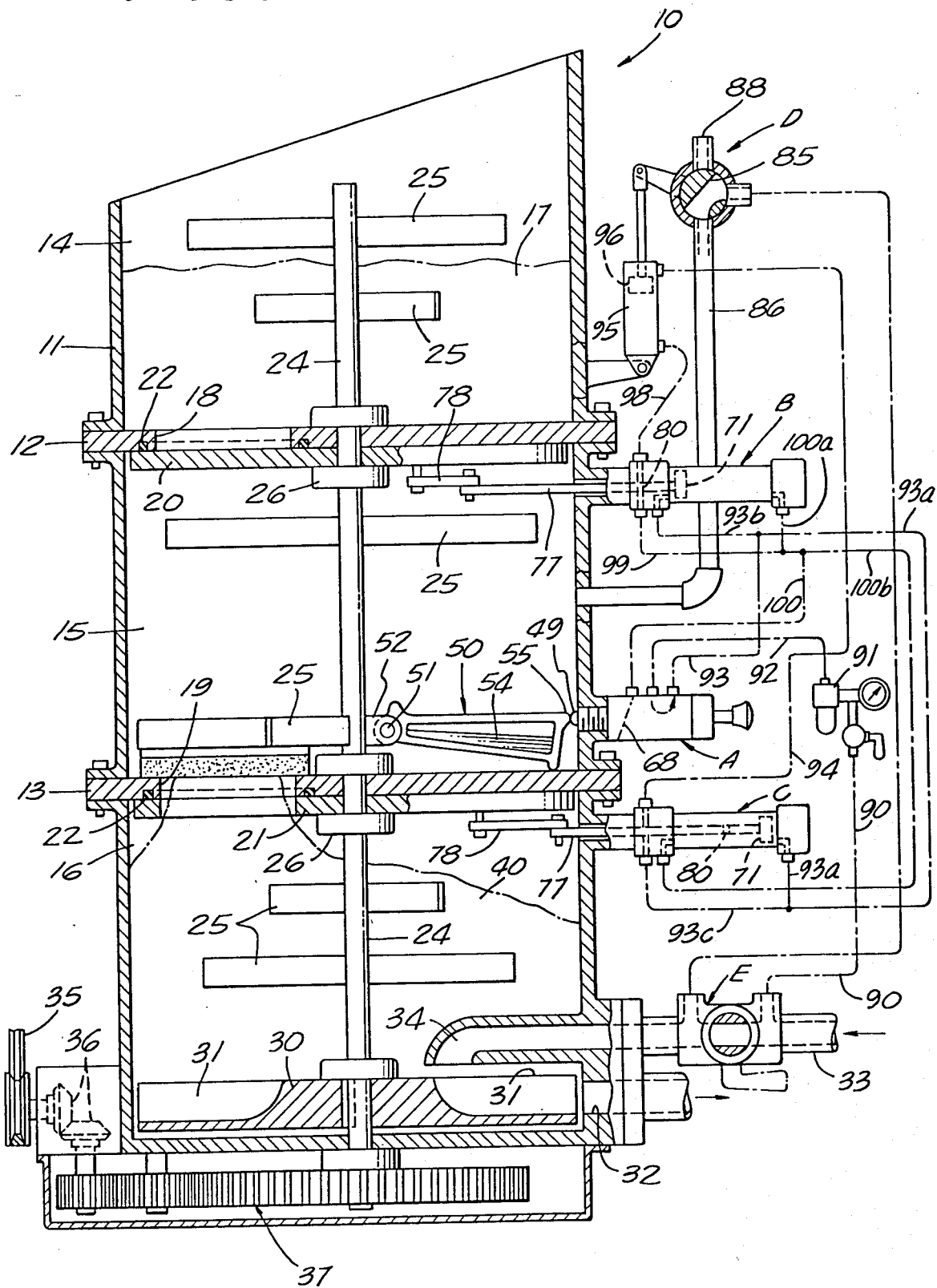
FIG. 1 is a vertical sectional view through the main material handling chamber of an illustrative embodiment of the apparatus and including a diagrammatic showing of the pneumatic control system and with the parts positioned to initiate a material replenishing cycle for the central chamber.

Referring to FIG. 1 there is shown an illustrative embodiment of a material feeding apparatus, designated generally 10, having a thick-walled main housing 11 divided by ported diaphragms 12, 13 into a first or a material receiving chamber 14, a second or replenishing chamber 15, and a third or material dispensing chamber 16. Receiving chamber 14 may be supplied with fluent material 17 from any convenient bulk source and typically is at atmospheric pressure. Ported diaphragms 12,13, separating chamber 15 from chambers 14 and 16, are each provided with three flow ports 18,19 normally closed by respective similarly ported rotary ported valves 20,21. Each valve has three flow ports (only one shown) each encircled by a suitable sealing gasket such as gaskets 22.

A power driven agitator spindle 24 extending vertically through all three chambers 14,15,16 are provided with agitator blades 25. Each of the valves 20,22 is journalled on and freely rotatable about spindle 24, these valves being held pressed against the sealing gaskets in diaphragms 12,13 by collars 26 clamped to the spindle by set screws or the like, not shown. Keyed to spindle 24 closely adjacent the bottom of chamber 16 is a conventional material feeding wheel 30 subdivided into radial sectors by radial vanes 31. The outer ends of these sectors open sequentially into the material dispensing duct 32. This material dispensing operation is performed by pressurized air supplied from a main source through a supply duct 33 and discharging through outlet 34 at the inner radial end of one of the dispensing sectors between blades 31. Spindle 24 is driven from a pneumatically operated motor, not shown, driving a belt 35 connected to spur gears 36 and driving speed reduction gearing 37 connected to the lower end of the spindle.

It will be apparent from the foregoing that the common drive for the agitator and feed wheel 30 advances first one and then another of the material-laden sectors between vanes 31 into alignment with the pressurized air outlet 34 and the inlet to the dispensing conduit 32. This operation serves to dispense a pressurized airborne stream of fluent material through the dispensing duct and to a point of utilization of the material. One particularly useful application of the invention apparatus is to dispense cementitious material in a plastering or cementing operation.

The control mechanism for the apparatus as well as the means for maintaining chamber 15 pressurized except during a replenishing cycle and chamber 16 pressurized at all times will now be described. The control includes five principal valves including the semi-automatic cycle control valve A, the combined valve and actuators B and C operating valves 20,21 respectively, venting valve D, and the main pressurized air control valve E.

The cycle control valve A has a cylindrical main body 45 provided with a threaded boss 44 rigidly supporting the same in the sidewall of second chamber 15 in the location best shown in FIGS. 1 and 2. Reciprocably supported in bore 46 of body 45 is a spool valve 47 having an operating handle 48 mounted on its outer end thereof. The inner conical end 49 projects into chamber 15 into the path of a material level sensor 50.

Sensor 50 is pivotally mounted at its inner end on a pivot pin 51 journalled in a bracket 52 carried by the agitator spindle 24, and has a cross-sectional shape best shown in FIG. 6. A principal feature is a vane 54 extending along the length of the sensor and inclined to a horizontal plane in a direction such that the rotation of the sensor with spindle 24 causes the sensor to pivot upwardly and ride generally on or close to the surface of the material 52 in chamber 15, such as the position indicated in FIG. 2. So long as there is a substantial quantity of fluent material in chamber 15 sensor 50 will be inclined upwardly. As the level of material 52 approaches the bottom of chamber 15, sensor 50 pivots downwardly until finally button 55 protruding radially from the outer upper end of the sensor contacts the end 49 of valve spool 47 and shifts the latter to its alternate position shown in FIG. 4 to initiate a material replenishing cycle for chamber 15.

Spool 47 of control valve A has first, second and third lands 57, 58, 59 lands 57, 58 having the same diameter and land 59 being somewhat larger and operating in a correspondingly larger diameter portion 46a of bore 46. These lands separate first, second, third and fourth annular grooves from one another as is apparent from FIGS. 3 and 4, the first groove being to the left of land 57 and the fourth groove being to the right of land 59. A buffer and sealing gasket 61 surrounds the spindle of the spool valve and abuts the end of land 59 when the spool is in its alternate or first operating position as shown in FIG. 4. A second buffer and seal gasket 62 seats against the shoulder at the base of bore 46a and limits the movement of the spool valve when in its first or armed position as shown in FIG. 3.

Valve A has a single pressurized air inlet passage 65 located between a pair of passages 66,67, these latter passages serving alternately as pressurized air inlets and as outlet passages. There also are atmospheric vent passages 68,69 opening through the lower side of valve body 45. It will be observed that passage 66 has a branch 66a communicating with the right hand end of bore 46a. When the valve is in its armed position as shown in FIG. 3, pressurized air is usually present in passage 66 and acts against the right hand face of land 59 to hold the spool valve firmly in its armed position in opposition to the air pressure normally prevailing in chamber 15.

Turning now to FIG. 5, a typical one of the identical combined actuators and valves B and C will be described. Each includes a two-way pneumatic power cylinder 70 slidably supporting a piston 71 having reduced ends 72,73 having a close sliding fit in wells 74 and 75 at the opposite ends of the cylinder. These wells serve as dash pots to slow down and snub the approach of piston 71 at the opposite ends of its stroke. Piston 71 is equipped with a piston rod 77 extending through the sidewall of the apparatus housing 11 and is connected by a pivoting link 78 with a respective one of valves 20,21 controlling the flow of fluent material toward the dispensing chamber 16. To be noted is the fact that each of the snubber pistons 73,72 is provided with an L-shaped restricted bleeder passage 78 permitting air to bleed slowly from wells 74,75 as the piston approaches one of the other end of its stroke. It will also be noted from FIG. 5 that each of the piston rods 77 is provided with a diametric passage 80. This passage is so located as to provide communication between aligned passages 81 and 82 only when piston 71 of both actuators B and C is at the left hand end of its cylinder.

Three-way valve D is operable when positioned as shown in FIG. 1 to supply pressurized air through passage 85 into the replenishing chamber 15 via conduit 86. However, when rotated 90° to its alternate position (FIG. 2), by its operating cylinder 95, the pressurized inlet 87 is closed and pressurized air present in chamber 15 is vented to the atmosphere through outlet 88.

OPERATION

Let it be assumed that the apparatus has been in operation for a period of time sufficient to substantially exhaust the contents of the replenishing or second chamber 15. At this time dispensing chamber 16 remains substantially full for obvious reasons and is available for dispensing during the recharging of chamber 15. At this time, upper valve 20 will be closed and lower valve 21 will be open and chambers 15 and 16 will be pressurized at a suitable operating pressure, such as 100 psi. As sensor 50 rotates with spindle 24, its button 55 will traverse end 49 of control valve A and shift spool 47 from the first operating position shown in FIG. 3 to the second operation position shown in FIG. 4. This allows the pressurized air in the enlarged end of bore 46a to vent to the atmosphere via passage 66a vent 68. Referring now to FIG. 1, it will be evident that pressurized air from the main supply conduit 33 will flow through line 90, filter 91, and via line 92 into inlet 65 of valve A.

This air will then exit through passage 67 of valve A and flow through conduits 93, 93a into the right hand end of actuator C, causing piston 71 to move to the left to close valve 21. This valve closes without difficulty because both chambers 15,16 are at the same pressure. As piston 71 reaches the left hand end of its stroke, passage 80 and its piston rod 77 will align with passages 81,82 (FIG. 5) thereby allowing pressurized air in line 93a to pass through conduit 94 into the upper end of cylinder 95. This air will then force piston 96 downwardly as the air in the lower end of cylinder 95 exits through conduit 98, and passages 80,81,82 of actuator B. In this connection it will be recalled that piston 71 of actuator B is at the left hand end of its stroke to maintain valve 20 closed. Hence passage 80 through its piston rod is aligned with passages 81, 82 thereby allowing air present in the lower end of cylinder 95 to escape to the atmosphere via conduit 98, passages 80,81,82, lines 99,100 and passage 68 of valve A.

The downward movement of the piston in cylinder 95 moves venting valve D to its alternate position wherein passage 85 of that valve vents chamber 15 to the atmosphere via conduits 86, passage 85 and the atmospheric outlet 88 while, at the same time cutting off the pressurized air to chamber 15. It will take a short period of time to relieve the pressure in chamber 15 via venting valve D but, as this pressure approaches atmospheric, pressurized air already present in conduits 93 and 93b will enter the left hand end of actuator B and force its piston 71 to the right thereby opening valve 20 so that material 17 present in receiving chamber 14 can flow through port 18 into and fill the replenishing chamber 15. Of course the movement of piston 71 to the right shifts its passage 80 out of alignment with passages 81,82 thereby closing off the outlet from the lower end of cylinder 95.

As the material flows into chamber 15, the continuing rotation of agitator 24,25 and of level sensor 50 causes this sensor to pivot upwardly about pivot pin 51 and away from the inner end 49 of the valve spool 47 in control valve A. However, this valve remains in its open position (FIG. 5 until the operator manually depresses button 48 to shift the spool back to its initial or second position shown in FIG. 3. Once returned to this armed position, the pressurized air always present in passage 65 of valve A enters passages 66, 66a and acts on the larger diameter land 59 to hold the spool valve safely in its normal armed position.

Concurrently, pressurized air exits via passage 66 in valve A and flows via passage 100 and connecting passage 100A into the right hand end of actuator B causing the piston of that actuator to shift to the left and close valve 20 between chambers 14,15. Pressurized air also enters passage 100B leading into the left hand end of actuator C but it is unable, at this time, to open valve 21 because of the high pressure then prevailing in chamber 16 and the low pressure prevailing in chamber 15 thereby clamping valve 21 closed. Since valve A is rearmed to the position shown in FIGS. 2 and 3, pressurized air now present in line 100 passes via lines 99,80,81,82, and 98 to cylinder 95. Cylinder 95 acts to close venting valve D to repressurized chamber 15 via line 102, valve D and line 86. As soon as the pressure in chamber 15 has been equalized with that in chamber 16, pressurized air present in line 100B acts on piston 71 of actuator C to reopen valve 21.

It will be understood that prior to the reopening of valve 21, passage 80 of actuator C is in communication through conduit 94 with the upper end of cylinder 95 with the result that air from this cylinder can be vented to the atmosphere through passage 80 of actuator C, and line 93c in communication with lines 93a,93 and venting passages 67 and 69 of control valve A.

The operating cycle is now complete and the apparatus continues to dispense pressurized airborne fluent material and to replenish chamber 15 periodically as its charge.

While the particular improved spool valve assembly herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A flow control valve comprising:
   (a) main body having a central bore open at each end;
   (b) a two-position spool valve having no neutral operating position slidably supported in said bore for movement between first and second operating positions and adapted to be actuated in one axial direction to said second position via the open end of said central bore;
   (c) means at one end of said spool valve for actuating the same from said second position to said first position;
   (d) said spool valve having only first, second, third and fourth annular grooves separated by first, second and third annular lands;
   (e) said main body having (1) a pressurized fluid supply passage continuously in communication with said second groove, (2) separate fluid venting passages for venting only unpressurized fluid from a respective one of said first and third grooves and in continuous communication therewith, (3) a fluid passage in selective communication with either said first or said second groove depending upon the position of said spool valve axially of said bore, and in communication with said fourth groove when in communication with said second groove, and (4) a fluid passage in communication with either said second or said third groove depending upon the position of said spool valve axially of said bore; and
   (f) means at the other end of said spool valve for actuating the same to said second position.

2. A flow control valve as defined in claim 1 characterized in that said fourth groove is substantially deeper than said third groove whereby the supply of pressurized fluid to said fourth groove acts to bias said spool valve to said first position, and said third land being positioned and effective to block the supply of pressurized fluid to said fourth groove when said spool valve is in said second operating position thereof.

3. A flow control valve as defined in claim 2 characterized in that depth of said fourth groove is such that the surface of the radial face of said third land is greater than the cross-sectional area of said spool valve whereby the fluid pressure when present in said fourth groove is effective to bias said spool valve to said first position.

4. A flow control valve as defined in claim 1 characterized in that said means for shifting said spool valve toward said first position includes manually operable means.

5. A flow control valve as defined in claim 1 characterized in that portions of said spool valve project from the opposite ends of said main body, sealing means encircling the opposite end portions of said spool valve and providing a fluid seal between said main body and a respective one of said first and fourth annular grooves, and a threaded cap encircling the portion of said spool valve projecting from one end of said main body and serving to hold said spool valve detachably assembled to said main body.

* * * * *